United States Patent
Bauer et al.

[15] 3,668,119
[45] June 6, 1972

[54] PROCESS FOR OBTAINING AN ASBESTOS-FIBER MATERIAL OF A HIGH DEGREE OF SEPARATION

[72] Inventors: Dietrich Bauer, Kahl, Main; Helmut Fratzscher, Grossauheim, both of Germany

[73] Assignee: Deutsche Gold-und Silber-Scheidean-stalt Vormals Roessler, Frankfurt am Main, Germany

[22] Filed: Feb. 4, 1971

[21] Appl. No.: 112,680

[30] Foreign Application Priority Data

Feb. 5, 1970 Germany..................P 20 05 226.0

[52] U.S. Cl................................................210/42, 210/78
[51] Int. Cl..........................................................B01d 37/00

[58] Field of Search................................................210/42, 78

[56] References Cited

UNITED STATES PATENTS

| | | | |
|---|---|---|---|
| 2,533,149 | 12/1950 | Stang | 210/42 X |
| 3,399,133 | 8/1968 | Gerdes et al. | 210/42 |
| 3,542,674 | 11/1970 | Machlan | 210/42 |

Primary Examiner—J. L. De Cesare
Attorney—Michael S. Striker

[57] ABSTRACT

A colloidal solution of Chrysotile asbestos which is obtained from a pre-purified aqueous suspension of crude Chrysotile asbestos by means of a shearing action is subjected to filtration or centrifuging to eliminate therefrom incompletely separated colloidal matter. Subsequently, the asbestos is precipitated from the refined solution and subjected to further processing.

13 Claims, 1 Drawing Figure

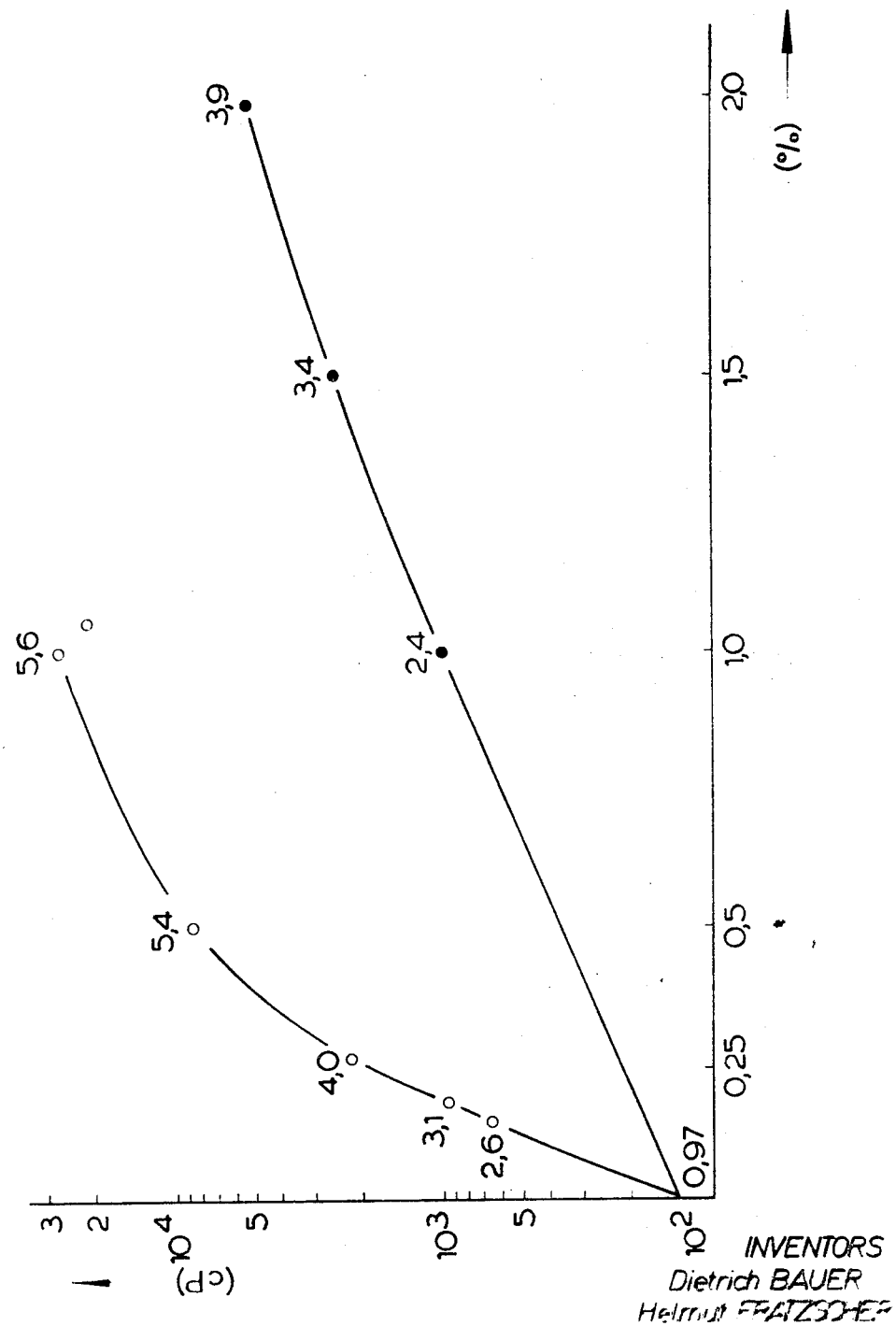

3,668,119

PROCESS FOR OBTAINING AN ASBESTOS-FIBER MATERIAL OF A HIGH DEGREE OF SEPARATION

BACKGROUND OF THE INVENTION

The present invention relates to a process for obtaining an asbestos fiber product with improved properties and better usefulness for industrial purposes. The asbestos is obtained from a stable aqueous dispersion of Chrysotile asbestos.

In order to modify organic and inorganic binder containing systems, such as lacquers, dyes, coating and spraying compositions, fillers are necessary to an increasing degree. These fillers provide for particular properties for the entire system as may be necessary in a particular connection. For instance, for lacquer and printing dyes pigments are necessary which have a desirable effect on the thixotropy and antisedimentation properties of the dyes.

For certain uses there is additionally the requirement of high transparency and/or high thickening properties. The lacquers and pigment coatings furthermore should not have any surface roughness which is particularly critical in case of very thin lacquer coatings.

If several of these requirements coincide, as for instance in the manufacture of clear lacquers, the expert frequently is faced with the problem that he has to select a filler which must meet the different highly divergent requirements in regard to the final product and which in addition should permit being incorporated in a comparatively easy manner.

For these purposes the preferred asbestos material is the Chrysotile asbestos which is mined in the neighborhood of Coalinga, California. This is a short-fiber chrysotile asbestos of classes five to seven, according to the Canadian Standard Classification System.

Chrysotile asbestos consists of minute elementary fibers (primary fibers) which are agglomerated to secondary fibers. Recent scientific investigations have shown that the Coalinga asbestos most frequently has the exterior diameter of 220 A and the most frequent interior diameter of 45 A (J. J. Fripiat and M. della Faille, Fifteenth Conference on Clays and Clay Minerals [1967] 305). The secondary fibers in this case form packets of many thousands of primary fibers which are arranged in a hexagonally closest packing. The interstices occurring are entirely empty.

It is known to obtain asbestos fibers for various uses by converting a high-percentage crude chrysotile asbestos in aqueous suspension, possibly in the presence of an acid, to a stable sol by the action of a high shearing force. The initial chrysotile asbestos has been subjected to a prior mechanical separation of impurities by a wet and/or dry process, for instance by forming suspensions, flotation, screening, classifying or magnet-separation. The stable sol obtained in the process is then precipitated by addition of alkali or an electrolyte and is finally separated, dried and if desired subjected to grinding.

However, it has been found that the asbestos products obtained from such colloidal solutions surprisingly are not uniform but always contain fractions which, even in a subsequent grinding operation cannot be comminuted and therefore interfere with further processing for different uses. This type of filler, therefore, meets only partly, for instance, the high requirements with regard to freedom from spots, smoothness of surface and transparency for clear lacquers. These conventional asbestos thickening agents furthermore cause clogging up of the usually employed 200 $\mu$ nozzles in the so-called airless spray applications of plastisols and organosols.

It is therefore an object of the present invention to provide for a manufacture of an asbestos fiber material from colloidal solutions which has been obtained by subjecting an aqueous suspension of a pre-purified crude chrysotile asbestos to the action of a high shearing force which suspension may include an acid. More specifically the object of the invention is to improve this kind of product obtained from this type of colloidal solution so as to make it useful for various technical uses.

SUMMARY OF THE INVENTION

The invention resides in a process wherein the colloidal solution of the chrysotile asbestos is subjected to filtration or centrifuging so as to eliminate therefrom incompletely separated colloidal matter, whereupon the asbestos is precipitated from the refined solution and may subsequently be subjected to further processing, such as drying and grinding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a graph showing the viscosity and thixotropy index in relating to the percentage amount of the added asbestos.

DETAILED DESCRIPTION OF THE INVENTION AND OF PREFERRED EMBODIMENTS

The filtration necessary in the process of the invention is preferably carried out in a filter press provided with a cloth filter which has apertures that are smaller than the average length of the obtained primary fibers. Suitable are filter cloths of a polylactone ("Perlon") of a weight of 376.9 g per m² with a fiber of Nm 10.6 m/g warp and Nm 10.13 m/g weft.

Surprisingly, this type of filter permits passage of colloidal solutions of a primary fiber of about 20 $\mu$ average length, although the filter apertures have a substantially smaller dimension.

The filtration can furthermore be effected with a filter centrifuge provided with a corresponding cloth filter inset. The filter residue produced in this way contains predominantly hard, compact agglomerates which during the separation process could not be separated and which, even during grinding of the dried final decomposition product, cannot be further defibrilated.

For a continuous operation, it is preferable to centrifuge the colloidal solution by means of an overflow (basket) centrifuge or a separator or a hydrocyclone.

The possibility of separating out the colloidal secondary fibers from the asbestos sol is surprising for a number of reasons.

The specific sedimentation speed of a particle in a gravity field is strongly affected by its exterior shape. Stretched-out particles have a sedimentation speed which depends on their length/thickness ratio and is many times slower than that of spherical particles of the same weight (J.M. Burgers, Kon.Ned.Akad.Wet., Verhand, Eerste Sectie Dl. SVI, 113–184).

The crystalline structure of a chrysotile primary fiber consists, proceeding from the inside to the outside, of several successive curved planes of $O_3$—$Si_2$—$O_2(OH)$—$Mg_3$——$(OH)_3$ (H. Jagodzinski and G. Kunze, Neues Jahrbuch f. Mineralogie, Montasheft (1954) pp. 137–150). The exterior surface of a primary fiber, therefore, consists of OH groups packed densest in hexagonal line. If these primary fibers are introduced into a medium having an acid pH, the OH groups are neutralized. The surface of the primary fiber then has a multiplicity of primitive electrical charges.

A typical primary fiber of 5 $\mu$ length has a volume of $18 \times 10^8$ $A^3$, an exterior surface of about $35 \times 10^6$ $A^2$, and a mass of about $45 \times 10^{-16}$ g (density of Coalinga asbestos 2.45 g/cm³). The diameter of a spherical particle of the same weight and same density is about 0.2 $\mu$.

In contrast with a secondary fiber of for instance 20 $\mu$ length and 2 $\mu$ diameter, the diameter of a sphere of the same weight and density would be about 10 $\mu$ and in case of a secondary fiber of about for instance 50 μ length and 4 μ diameter it would be about 30 μ. From the investigations of F. Pundsack and G. Reimschussel, (published in Journ.phys.Chem. 60, [1956] p. 1,218) it is known that about 7 percent of all of the OH groups present in the primary fibers are located at its surface. This permits to compute the number N of the OH group present at the exterior surface of the individual primary fibers as $N = $ ca. $2.7 \times 10^6$ This value is in accord with the value which is calculated directly on the basis of the OH group density.

As already mentioned, the interspaces between the primary fibers which form the building block of the secondary fibers in the hexagonally highest density are entirely empty. Svedberg has observed that the sedimentation of charged colloidal particles in a gravity field is delayed because of the electrostatic attraction by lighter oppositely charged ions (in this case anions). Because of this effect, an apparent weight is found for a colloidal particle which dissociates into $n$ light ions and one heavy ion amounting approximately only to the $(n+1)$th part of the actual particle weight (T. Svedberg, Kolloid-Z., Zsigmondy-Festschrift, Supplement to 36 (1,925) 53). To suppress this effect it is possible to add larger amounts of electrolyte to a colloidal solution. However, this is not practical with a colloidal asbestos sol, since already low electrolyte concentrations cause a flocculation of the asbestos sol. The positive surface charges, accordingly, cause the colloidal asbestos particles to remain suspended.

According to the above data, the actual mass of the primary fiber should be $45 \times 10^{-16}$ g. However, because of the effects of the sol stabilizing charge, this actual mass is replaced by a mass which is up to $2.7 \times 10^{\,6}$ smaller, more particularly is about $17 \times 10^{-2}$ g (effective mass). If for a spherical particle which is of equal weight to the primary fiber the diameter is calculated as 0.2 micron, because of the effect of the charge, the resultant effective particle diameter is only 2 mμ.

However, it is known that with the conventional industrial centrifuges only particles with a diameter up to 500 mμ and, in extreme cases, perhaps up to 50 m** can be separated. Even in an ultracentrifuge it is known that only particles up to 3 mμ can be caused to form a sedimentation. This shows that the primary fibers of a sol are not amenable to a separation by centrifuging. However, since the surface of a secondary fiber and the number of the surface OH groups present for each secondary fiber is composed additively from the values found for the primary fiber in the same manner as the weight of the secondary fiber, theoretically the same considerations must apply as in case of primary fibers, that is, the effects of the charges should also in this case exclude a sedimentation by centrifugal forces.

In conformity with these considerations, the observation has been made that even comparatively large secondary fibers, which are still at the threshold of visually recognizable size, do not sediment in colloidal condition even though standing for a long time. It is all the more surprising that actually a separation by use of the centrifugal force available in industrial centrifuges can be obtained. This unexpected result so far has not been explained.

The products which are obtained from the refined sol of the invention by means of precipitation, separation, drying, and if desired grinding, for instance in a hammer mill, rod mill or gas-jet mill, are distinguished by high transparency, supreme fineness of the grain and extraordinarily high thickening properties, for instance in pigment and lacquer systems. They furthermore impart to such systems a very desirable thixotropy index. They can be used with advantage in coating and sealing masses, plastisols, organosols, casting resins, priming compositions, adhesives, resin mastics, enamel frits, thermoplastic screen printing dyes, asphalt mixtures, cleansing pastes, and high-temperature fats. The following examples will further illustrate the invention. These examples illustrate various properties important for the industrial use as they are imparted to a polyester test lacquer, and some of it in comparison to the effects of commercial asbestos-fiber products.

The test lacquer was formed as a mixture of the following components.

The following test methods were used to appraise the products obtained by the process of the invention and comparison products:

1. Thickening effect.

To ascertain the thickening effect a suitable amount, for instance 1.6 g, of the asbestos product was stirred by hand with a spatula into 98.4 g of the test lacquer. The mass was then dispersed for 10 minutes at 1,500 RPM with a paddle stirrer (diameter 5.2 cm) at a temperature of 17°–22° C. To avoid loss in styrene, the box used as the vessel (diameter 7.3 cm) was covered with aluminum foil. Two hours after forming the dispersion, the viscosity was measured with a viscosimeter at 20° C (manufactured by Haake Bros. of Berlin, Germany). Depending on the viscosity to be measured, the following measuring bodies were used:

| | |
|---|---|
| up to 5,000 cP | measuring body MV II |
| 5,000–15,000 cP | measuring body SV I |
| from 15,000 cP | measuring body SV II |

Care must be taken that the measurements given for the stirring vessel and stirrer and the rotation figure are strictly observed, since otherwise a viscosity of varying magnitude may be found.

2. Grain fineness 0.5 wt.-% of the asbestos product were incorportated in the test lacquer and the grindometer value was determined with a grindometer of Hegman, type 232, of the Erichsen Company (GmbH) of Hemer, Germany.

3. Transparency

In order to determine the transparency the light absorption was measured with a light-electric calorimeter Model J according to Lange of the Lange Company of Berlin, Germany. For this purpose an 0.5 weight percent dispersion of the asbestos was employed in the test lacquer.

4. Thixotropy index

The thixotropy index represents the ratio of the viscosity of a system at varying shearing differentials. The viscosity is measured with a Brookfield viscosimeter, Model LVT. The viscosity in these cases was measured under the following conditions:

a. measurement after 3 rotations at 3 RPM
b. measurement after 10 sec. at 30 RPM The thixotropy index is calculated as follows:

thixotropy index = viscosity 1/viscosity 2

5. Run-off properties

To observe the run-off behavior an amount of 2 g of the mass containing the thickening agent was applied to a glass plate. The plate was then put into vertical position, and the run-off property was thus observed.

6. Electronmiscroscopic photographs

These give information on the content of incompletely separated material.

EXAMPLE 1

Purification of a colloidal asbestos solution by means of a filter press

A sol was formed by applying, by means of a "Dispax" reactor and a high shearing force to a mass formed of 200 liters distilled water, 1,000 g Coalinga asbestos and 240 g concentrated acetic acid. This sol was then pressed through a filter press. The filter press was provided with 10 filter frames of the dimensions of 40 × 40 × 2.5 cm and a polylactone (perlon) filter cloth of a weight/m² of 376.9 g (with a fiber Nm 10.6 m/g warp and Nm 10.13 m/g weft). The filter cloth held back rough and hard material. After flocculation of the filtered asbestos sol by addition of a soda solution, separation and drying of the asbestos fibers at 110° C, a high-grade fiber product was obtained. After subsequent grinding in a hammer mill, and thereafter in a rod mill, a thickening in a test lacquer was obtained of 15,200 cP. In comparison the thickening obtainable with a commercially available asbestos fiber product was only 4,000 cP.

EXAMPLE 2

Purification of a colloidal asbestos solution by means of a filter centrifuge

A sol was formed by subjecting a mixture of 10 l distilled water, 100 g Coalinga asbestos, and 166 ml monomolecular acetic acid to a shearing force by means of a siren-type mixer. Subsequently 5 l of the mixture were centrifuged in a filter centrifuge of a drum diameter of 300 mm at 3,000 RPM. The centrifuge was equipped with a filter bag made of a fabric of the same type as the filter cloth used in Example 1. From the filtered sol which drained from the filter centrifuge, 18 g purified asbestos were then isolated. After drying at 110° C and grinding in a rod mill, the following properties were established in comparison to two commercial products:

a. Thickening properties

| Product | viscosity upon addition of 1.6% | viscosity upon addition of 0.2% |
| --- | --- | --- |
| product of the invention | 38000 cP | 2600 cP |
| commercial product I | 4700 cP | 365 cP |
| commercial product II | 280 cP | 183 cP | b. Degree of grain size

In this test the grindometer value was established of a dispersion in a test lacquer which contained 0.2 percent asbestos:

| Product | Grindometer value |
| --- | --- |
| product of the invention | 32 μ |
| commercial product I | 83 μ |
| commercial product II | 90 μ | c. Thixotropy index

The thixotropy index was established in a test lacquer dispersion containing 0.2 percent asbestos.

| Product | Thixotropy index |
| --- | --- |
| product of the invention | 4.31 |
| commercial product I | 1.72 |
| commercial product II | 1.06 |

10 liters of the same starting sol were centrifuged in a filter centrifuge of a drum diameter of 250 mm and a maximum RPM of 2,000. The same filter bag was used as in the description above. From the filtrate obtained 25 g asbestos were isolated and ground in a rod mill. The ground product compared with commercially available products showed the following thickening properties at a concentration of 1.6 weight percent in the test lacquer:

| Product | Viscosity |
| --- | --- |
| product of the invention | 39000 cP |
| commercial product I | 4700 cP |
| commercial product II | 280 cP |

The thixotropy index was established at a content of the test lacquer of 1.6 percent and 0.2 percent asbestos fiber.

| Product | Thixotropy index at 1.6% | Thixotropy index at 0.2% |
| --- | --- | --- |
| product of the invention | 7.60 | 4.70 |
| commercial product I | 4.70 | 1.72 |
| commercial product II | 1.23 | 1.06 |

EXAMPLE 3

Refining of a colloidal asbestos solution by means of a hydrocyclone 130 liters of a sol consisting of 200 l distilled water, 1,000 g Coalinga asbestos, and 120 g concentrated acetic acid were passed through a hydrocyclone at a circulation rate of 400 l/h. The apex of the hydrocyclone was adjusted to provide for a ratio of volume of fine fractions to coarse fractions of 70:30. After flocculation of the colloidal solution that had passed through the hydrocyclone, a product was obtained with a thickening action of 41,000 cP.

EXAMPLE 4

Refining of a colloidal asbestos solution by means of an overflow centrifuge

As the following tables show, the two variable factors, that is RPM and throughput, have an effect on the yield, grain size, thickening property and transparency.

TABLE 1

(asbestos sol with 1% Coalinga)

| RPM | through-put l/h | Yield % | thickening effect cP | turbid-ity % | |
| --- | --- | --- | --- | --- | --- |
| 1000 | 50 | 66 | 30000 | 27.5 | |
| 2000 | 50 | 62 | 32500 | 26.0 | |
| 4000 | 50 | 44 | 38600 | 19.0 | |
| 1000 | 180 | 72 | 27000 | 25.0 | effect of rotation speed |
| 2000 | 180 | 70 | 31300 | 23.0 | |
| 4000 | 180 | 52 | 38600 | 21.0 | |
| 1000 | 500 | 94 | 28400 | 28.5 | |
| 2000 | 500 | 82 | 27600 | 25.5 | |
| 4000 | 500 | 70 | 28400 | 23.0 | |
| 1000 | 50 | 66 | 30000 | 27.5 | |
| 1000 | 180 | 72 | 27000 | 25.0 | |
| 1000 | 500 | 94 | 28400 | 28.5 | |
| 2000 | 50 | 62 | 32500 | 26.0 | effect of cir-culation amount |
| 2000 | 180 | 70 | 31300 | 23.0 | |
| 2000 | 500 | 82 | 27600 | 25.5 | |
| 4000 | 50 | 44 | 38600 | 19.0 | |
| 4000 | 180 | 52 | 38600 | 21.0 | |
| 4000 | 500 | 70 | 28400 | 23.0 | |

TABLE 2

(Asbestos sol containing 0.5% Coalinga)

| RPM | through-put l/h | Yield % | grindo-meter μ | thickening effect cP |
| --- | --- | --- | --- | --- |

| | | | | | |
|---|---|---|---|---|---|
| 1000 | 50 | 56 | 80 | 41,000 | |
| 1500 | 50 | 52 | 45 | 41,000 | |
| 2000 | 50 | 46 | n.d. | 42,000 | |
| | | | | | effect of the |
| 1000 | 250 | 60 | n.d. | 31,300 | rotation speed |
| 4000 | 250 | 50 | 45 | 38,7000 | |
| 1000 | 50 | 56 | n.d. | 35,000 | |
| 1000 | 90 | 59 | 80 | 31,300 | |
| 1000 | 250 | 60 | n.d. | 31,300 | |
| | | | | | effect of the circulation amount |
| 2000 | 50 | 46 | n.d. | 42,000 | |
| 2000 | 80 | 52 | 65 | 42,000 | |
| 4000 | 250 | 50 | 45 | 38,7000 | |
| 4000 | 400 | 56 | n.d. | 40,500 | |

L6 [n.d. = not determined]

As the tables show, the thickening effect increases with increasing number of rotations of the centrifuge and decreases with increasing amount of circulation. The transparency increases with increasing number of circulations. It ordinarily passes through a maximum, depending on the throughput. The grindometer value improves with increasing rotations of the centrifuge.

The evaluation of comparative electromicrographs of asbestos sols and final asbestos products made by prior-art methods and made by the method of the invention showed the following:

An electronmicrograph of an asbestos sol which had been diluted with water for the purpose of the photograph and subjected to drying (E-enlargement 1400; total enlargement 5,000:1). clearly showed unseparated secondary fibers and mineral crystalline impurities.

An electron micrograph of a sol which had been obtained under the same conditions but had been purified at a circulation speed of 300 l/h and 4,000 RPM by way of an overflow (basket) centrifuge, showed; a complete absence of secondary fibers. The fraction of mineral contaminations, was lower. Their grain size was far below 1 $\mu$ which latter would not in any way affect the properties necessary for practical use.

A similar electron micrograph of a commercial chrysolite asbestos product made by prior-art methods and taken as in the first case showed a product consisting predominantly of unseparated fiber agglomerates.

An electron micrograph of a final product obtained from a sol processed as in the second case by the process of the invention showed primary fibers present by far in a predominant number while the number of secondary fibers was limited.

The thickening effect and the thixotropy index were furthermore established with the asbestos-fiber products of the invention in an epoxy resin system and were compared with commercial products. Viscosity and thixotropy index were likewise determined in accordance with the discussed methods. The thixotropy-causing agent was incorporated in amounts between 0.25 and 2.0 weight percent according to the following formulation:

30.0 parts "EPIKOTE 1001" (Product of Shell Company)
1.5 parts "PLASTOPAL EBS" (about 60 percent in butanol)
36.5 parts solvent mixture 17.1 parts "VERSAMID 115"
17.1 parts solvent mixture
Solvent mixture:
50 parts xylene
20 parts n-butanol
20 parts methylglycol
10 parts cyclohexanone The viscosity and the thixotropy index appear from the following table in relation to the percentage amount of the added asbestos.

| % asbestos addition | Viscosity cP product of the invention | Viscosity cP commercial product | Thixotropy index product of the invention | Thixotropy index commercial product |
|---|---|---|---|---|
| 0.25 | 2,220 | 220 | 4.0 | n.d. |
| 0.5 | 9,370 | 360 | 5.4 | n.d. |
| 1.0 | 27,000 | 990 | 5.6 | 2.4 |
| 1.5 | n.d. | 2,570 | n.d. | 3.4 |
| 2.0 | n.d. | 5,480 | n.d. | 3.9 |

L6 [n.d. = not determined]

The drawing illustrates these results graphically. The two curves show the development of the viscosity for the product of the invention (curve o) and commercial product (curve ●) relative to the amount of the addition. The various figures appearing at the measurement points are the numbers ascertained for the thixotropy index.

A representation of the run-off property of an epoxide mixture which contained 2% of the asbestos according to the invention, compared with the run-off property of a similar epoxide mixture of the same solid concentration containing a commercially available asbestos fiber showed the superiority of the run-off properties of the test system containing the product of the invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of obtaining an asbestos-fiber material of a high degree and a high uniformity of separation comprising subjecting a colloidal solution of chrysotile asbestos to filtration, thereby eliminating therefrom incompletely separated colloidal matter, and subsequently precipitating the asbestos from the thus-refined colloidal solution.

2. The process of claim 1, wherein the colloidal solution is obtained by subjecting an aqueous suspension of the pre-purified crude chrysotile asbestos to a shearing action.

3. The process of claim 2, wherein the aqueous suspension contains an acid.

4. The process of claim 1, wherein the precipitated asbestos is subsequently subjected to drying and grinding.

5. The process of claim 1, wherein the filtering of the colloidal solution is effected with a filter press provided with a cloth filter having apertures of smaller dimension than the average length of the primary fibers present in said colloidal solution.

6. The process of claim 1, wherein the filtration is effected with a filter centrifuge provided with a cloth inset.

7. The process of obtaining an asbestos-fiber material of a high degree and a high uniformity of separation comprising subjecting a colloidal solution of chrysotile asbestos to centrifuging, thereby eliminating therefrom incompletely separated colloidal matter, and subsequently precipitating the asbestos from the thus-refined colloidal solution.

8. The process of claim 7, wherein the centrifuging of the colloidal solution is effected by means of an overflow centrifuge. colloidal matter, and subsequently precipitating the asbestos from the thus-refined colloidal solution.

9. The process of claim 8, wherein the colloidal solution is obtained by subjecting an aqueous suspension of the pre-purified crude chrysotile asbestos to a shearing action.

10. The process of claim 9, wherein the aqueous suspension contains an acid.

11. The process of claim 8, wherein the precipitated asbestos is subsequently subjected to drying and grinding.

12. The process of claim 8, wherein the centrifuging of the colloidal solution is effected by means of a separator.

13. The process of claim 8, wherein the centrifuging of the colloidal solution is effected by means of a hydrocyclone.

* * * * *